United States Patent [19]

Nakayama

[11] Patent Number: 4,926,318

[45] Date of Patent: May 15, 1990

[54] MICRO PROCESSOR CAPABLE OF BEING CONNECTED WITH A COPROCESSOR

[75] Inventor: Takashi Nakayama, Tokyo, Japan

[73] Assignee: NEC Corporation, Tokyo, Japan

[21] Appl. No.: 119,601

[22] Filed: Nov. 12, 1987

[30] Foreign Application Priority Data

Nov. 12, 1986 [JP] Japan ............................... 61-270143
Jan. 25, 1987 [JP] Japan ................................. 62-14945

[51] Int. Cl.$^5$ ............................................. G06F 15/16
[52] U.S. Cl. ................................ 364/200; 364/228.6; 364/228
[58] Field of Search ... 364/200 MS File, 900 MS File

[56] References Cited

U.S. PATENT DOCUMENTS

| | | | |
|---|---|---|---|
| 3,713,107 | 1/1973 | Barsamian | 364/200 |
| 4,014,005 | 3/1977 | Fox et al. | 364/200 |
| 4,075,693 | 2/1978 | Fox et al. | 364/200 |
| 4,128,876 | 12/1978 | Ames et al. | 364/200 |
| 4,130,866 | 12/1978 | Ono | 364/200 |
| 4,395,758 | 7/1983 | Helenius et al. | 364/200 |
| 4,509,116 | 4/1985 | Lackey et al. | 364/200 |
| 4,547,849 | 10/1985 | Louie et al. | 364/200 |
| 4,621,318 | 11/1986 | Maeda | 364/200 |
| 4,679,166 | 7/1987 | Berger et al. | 364/900 |
| 4,715,013 | 12/1987 | MacGregor et al. | 364/900 |

Primary Examiner—Gareth D. Shaw
Assistant Examiner—Kevin A. Kriess
Attorney, Agent, or Firm—Foley & Lardner, Schwartz, Jeffery, Schwaab, Mack, Blumenthal & Evans

[57] ABSTRACT

A micro processor capable of being connected with a coprocessor is disclosed. The microprocessor includes an execution unit and a bus control unit coupled to the execution unit. When the execution unit receives an instruction to be executed by the coprocessor, the bus control unit supplies to the coprocessor a command code responsive to the instruction. The micro processor further includes a terminal connected to the execution unit and supplied with a busy signal representing whether the coprocessor is in an arithmetic operating state. The execution unit controls the bus control unit to read status information of the coprocessor after the busy signal disappears. The presence or absence of the coprocessor is thus detected from the content of the read status information.

11 Claims, 8 Drawing Sheets

MICRO PROCESSOR CAPABLE OF BEING CONNECTED WITH A COPROCESSOR

BACKGROUND OF THE INVENTION

The present invention relates to a central processing unit and, more particularly, to a micro processor capable of being connected with a coprocessor.

In a micro processor fabricated on a single semiconductor chip, the number of circuit elements formed within the single chip is restricted, and hence it is difficult to fabricate a unit in the same chip that executes high level instructions such as a floating-point arithmetic operation, a function arithmetic operation, etc., at a high speed. In order to solve this problem, therefore, a coprocessor is employed, which executes the high level instructions in place of the micro processor. The coprocessor operates under the control of the micro processor and is thus called a "slave processor". The micro processor operates by itself as a central processing unit (CPU) to control the coprocessor along with a memory and peripheral units and is thus called a "master processor".

When the master processor decodes the high level instruction, it accesses the slave processor. If the master processor is not connected with the slave processor, the master processor should execute the high level instruction by use of its arithmetic unit. Therefore, the master processor requires means for detecting whether or not the slave processor is connected thereto.

For this purpose, a prior art system provides in the master processor a flag representative of the presence or absence of the slave processor. When the master processor decodes the high level instruction, it reads out and checks the content of the flag. When the flag is stored with information representative of the presence of the slave processor, the master processor accesses the slave processor to supply command information thereto. When the content of the flag represents that the slave processor is not provided, the master processor executes the instruction by itself. According to this prior art, however, the master processor should check the content of the flag irrespective of the presence of the slave processor. For this reason, the executing time of the high level instruction is prolonged which lowers the arithmetic speed. Moreover, in a case where a plurality of slave processors are required, a plurality of flags corresponding to the respective slave processors are necessitated which undesirably increases the hardware of the master processor.

SUMMARY OF THE INVENTION

Therefore, an object of the present invention is to provide an improved micro processor capable of being connected with a coprocessor.

Another object of the present invention is to provide a master processor which can detect the presence or absence of a slave processor without employing a flag.

A further object of the present invention is to provide a new control system between a master processor and a slave processor.

A micro processor according to one aspect of the present invention comprises an execution unit executing a program, a bus control unit coupled to the execution unit and controlling address and data buses to supply to a coprocessor a command code responsive to an instruction to be executed by the coprocessor, and a terminal connected to the execution unit and supplied with a busy signal which takes a first level when the coprocessor is in an arithmetic operating state and a second level when the coprocessor is not in the arithmetic operating state, whereby the execution unit detects the level of the busy signal after the command code is supplied to the coprocessor and controls the bus control unit to read status information of the coprocessor when the level of the busy signal is the second level.

A processor according to the present invention reads out the status information of the coprocessor. If the coprocessor is absent, the busy signal is held at the second level and the contents of the read-out status information take an abnormal value. Therefore, the absence of the coprocessor is detected without employing a flag representative of the presence or absence of the coprocessor. In a case where the coprocessor is provided, the coprocessor is brought into the arithmetic operating state in response to the supplied command code, so that the busy signal takes the first level. When the arithmetic operation by the coprocessor is completed, i.e. when the busy signal changes to the second level, the status information of the coprocessor is read out. If the status information an arithmetic exception, an error representation is carried out, for example. In a case where the status information does not contain the arithmetic exception, the arithmetic result is read out.

According to another aspect of the present invention, there is provided a micro processor comprising an execution unit executing a program, a bus control unit coupled to the execution unit and supplying to a coprocessor a command code representative of an instruction to be executed by the coprocessor, a first terminal coupled to the execution unit and supplied with a busy signal representing that the coprocessor is in an executing state of the instruction, and a second terminal coupled to the execution unit and supplied with a status read request signal representing that the status information of the coprocessor is to be outputted, whereby when both the busy signal and the status read request signal are absent, the execution unit controls the bus control unit to read out the arithmetic result of the coprocessor without checking the status information of the coprocessor. Thus, the execution time of the instruction is further shortened.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE EMBODIMENTS

Figure 1:
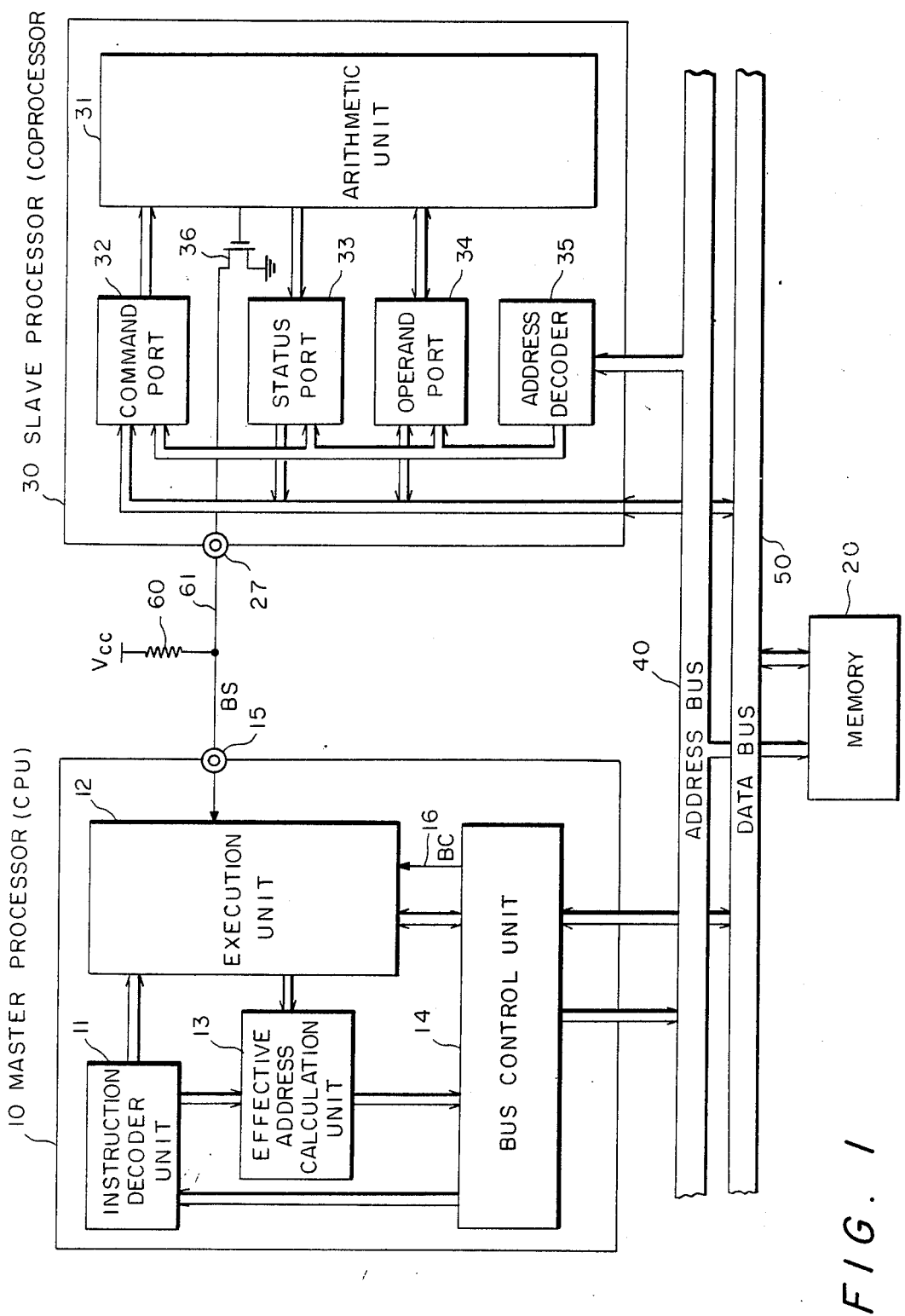
FIG. 1 is a block diagram representative of an embodiment of the present invention.

Referring to FIG. 1, there are shown a master processor 10 as a CPU, a slave processor 30 as a coprocessor, and a memory 20. The slave processor 30 operates under the control of the master processor 10 and executes at a high speed high level instructions such as a floating-point arithmetic operation, a function arithmetic operation, etc., in place of the master processor 10. The memory 20 is accessed by the master processor 10 and stores data and a program, including low level instructions and high level instructions. The master processor 10, the memory 20 and the slave processor 30 are interconnected via an address bus 40 and a data bus 50.

The master processor 10 includes an instruction decoder unit 11 for decoding instructions which are executed by the master processor 10 and the slave processor 30, an execution unit 12 for controlling the entire operation of the master processor 10 and for executing instructions under a micro program control, an effective address calculation unit 13 for calculating an effective address of each operand of respective instructions, and a bus control unit 14 for controlling the address bus 40 and the data bus 50 to access the memory 20 and the slave processor 30, these units 11 to 14 being coupled as shown via internal bus lines. The bus control unit 14 supplies a bus cycle signal BC of a high level to the execution unit 12 via a line 16 when it transfers command information of the instruction to be executed by the slave processor 30 to the data bus 50. The master processor 10 further includes a terminal 15 connected to the execution unit 12 and supplied with a busy signal BS which will be described later.

The slave processor 30 includes an arithmetic unit 31 for performing an arithmetic operation of high level instructions, a command port 32 for receiving, via the data bus 50, command codes of the instructions executed by the slave processor 30, a status port 33 for receiving the status of the arithmetic unit 31 and for outputting them to the data bus 50, an operand port 34 for receiving via, the data bus 50, data necessary to the arithmetic operation of the unit 31 and for outputting the arithmetic result to the data bus 50, and an address decoder 15 for receiving address information via the address bus 40 and for selecting one of the ports 32, 33 and 34 in response thereto, these units 31 to 35 being coupled as shown via internal bus lines. The slave processor 30 further includes an output terminal 37 and an N-channel MOS transistor 36 of an open-drain type. The source-drain path of the transistor 36 is connected between the terminal 37 and a ground and the gate thereof is connected to the arithmetic unit 31.

The terminal 37 of the slave processor 30 is connected via a line 61 to the terminal 35 of the master processor 10. The line 61 is pulled up to a power voltage Vcc via a resistor 60. The arithmetic unit 31 of the slave processor 30 supplies a high level to the MOS transistor 36 during a time period when the unit 31 is in the arithmetic operating state to turn the transistor 36 ON. Thus, the slave processor 30 produces the busy signal BS of a low level which is in turn supplied to the execution unit 12 of the master processor 10 via the terminal 15. The transistor 36 is in a non-conductive state except during an arithmetic operating period of the unit 31, so that the busy signal BS takes the high level. In other words, the slave processor 30 does not produce the busy signal BS.

Figure 2:
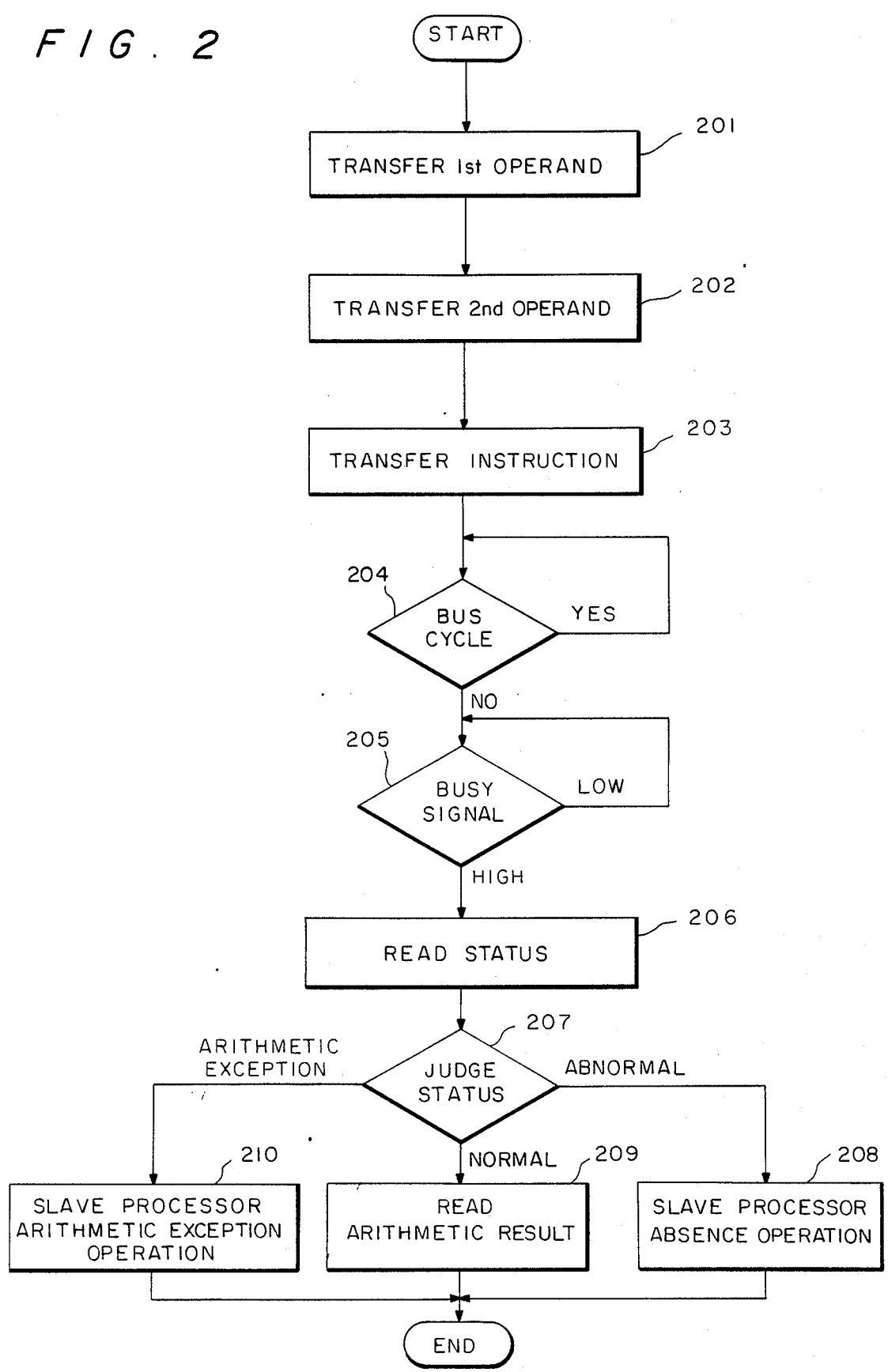
FIG. 2 is a flow chart representative of an operation of a master processor shown in FIG. 1.
Figure 3:
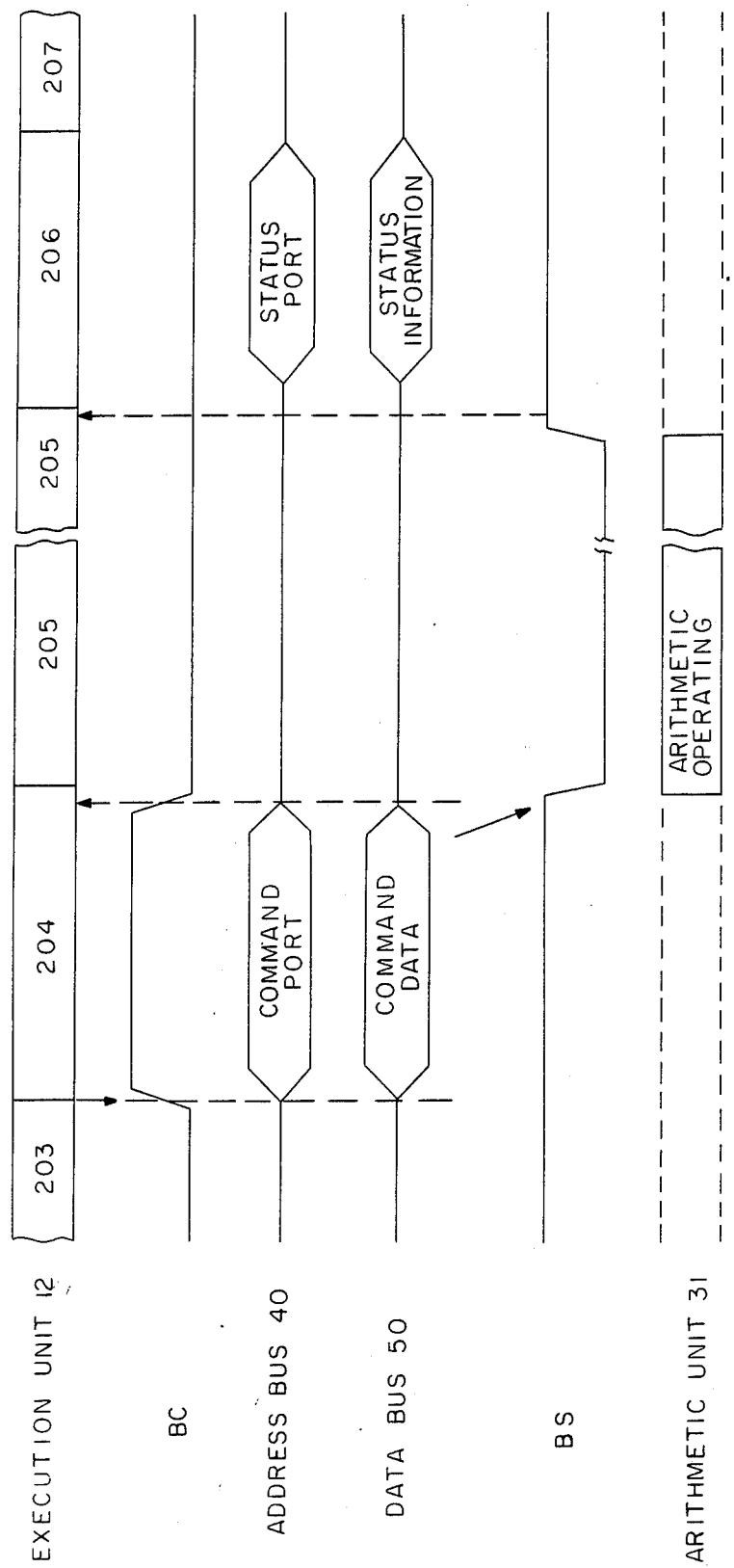
FIG. 3 is a timing chart representative of the operation shown in FIG. 2.

Referring to FIG. 2, there is shown a flow chart representative of an operation of the execution unit 12 in a case where the instruction decoder unit 11 decodes the instruction to be executed by the slave processor 30. This flow chart indicates a dyadic operation of "A+B→B". When the data of first and second operands A and B are stored in the memory 20, the execution unit 12 prompts the bus control unit 14 to read out the data of the first and second operands A and B from the memory 20 and to store them into the operand port 34 of the slave processor 30 (steps 201 and 202). Thus, the bus control unit 14 controls the address and data buses 40 and 50 and writes the data of the first and second operands A and B into the operand port 34. If the operands A and B are in registers (not shown) in the slave processor 30, the steps 201 and 202 are not carried out. Thereafter, the execution unit 12 supplies to the bus control unit 14 a command code inputted from the instruction decoder unit 11 and prompts the unit 14 to supply it to the command port 32 (step 203). In response to this prompt, the bus control unit 14 transfers the command code on the data bus 50 and the address information of the command port 32 on the address bus 40, as shown in FIG. 3. The command code on the data bus 50 is thus written into the command port 32. During this bus cycle period, the bus control unit 14 supplies the bus cycle signal BC of the high level shown in FIG. 3 to the execution unit 12 via the signal line 16. As a result, the execution unit 12 is brought into a standby condition until the bus cycle signal BC changes to the low level, i.e. until the write operation of the command code into the command port 32 is completed (step 204).

In response to the change of the bus cycle signal BC from the high level to the low level, the execution unit 12 checks the level of the busy signal BS supplied via the terminal 15 to detect whether or not the arithmetic operation by the unit 31 is completed (step 205). If the slave processor 30 is absent, the terminal 15 is pulled up to the high level by the resistor 60. That is, the busy signal BS takes the high level. Therefore, the execution unit 12 regards the arithmetic operation by the unit 31 as being completed and prompts the bus control unit 14 to read status information of the status port 33 (step 206). The bus control unit 14 transfers the address information of the status port 33 to the slave processor 30 via the address bus 40 and reads the status information stored therein which is in turn supplied to the execution unit 12 via the data bus. The execution unit 12 judges the content of the read-out status information (step 207). Since the slave processor 30 is absent and since each bit line of the data bus is pulled up or pulled down, all of the bits of the read-out status information are "1" or "0". Namely, the content of the status information takes an abnormal value. As a result, the execution unit 12 detects the absence of the slave processor 30 and executes the instruction to be executed by the slave processor 30 by itself, as represented as a slave processor absence operation (step 208). The execution unit 12 is not equipped with a function similar to the arithmetic unit 31, and therefore various low level instructions would be combined to execute the high level instruction, so that a processing time would be prolonged.

When the slave processor 30 is coupled to the master processor 10, as shown in FIG. 1, the unit 31 executes the arithmetic operation of the data between the first and second operands A and B stored in the operand port 34 in response to the command code supplied from the command port 32 and further supplies the high level to the transistor 36, which is thereby turned ON to change the busy signal BS to the low level, as shown in FIG. 3. Accordingly, the execution unit 12 receives the low level busy signal BS in response to the change of the bus cycle signal BC from the high level to the low level and thus regards the arithmetic unit 31 as being in an arithmetic operating state to inhibit the slave processor 30 from being accessed. The address and data buses 40 and 50 are thus brought into a free state. Although the execution unit 12 takes a standby condition in the flow chart shown in FIG. 2, since the buses 40 and 50 are free, the execution unit 12 may prefetch instructions from the memory by use of buses 40 and 50 or peripheral units (not shown) may use the buses 40 and 50. The execution unit 12 cyclically checks the level of the busy signal BS.

When the arithmetic operation by the unit 31 is completed, the unit 31 stores the status information and the arithmetic result into the status port 33 and operand port 34, respectively. The arithmetic unit 31 further supplies the low level to the transistor 36 to turn it OFF. The busy signal BS is thus changed to the high level by the pull-up resistor 60, as shown in FIG. 3. As a result of detecting the high level busy signal BS, the execution unit 12 regards the arithmetic unit 31 as having completed its arithmetic operation and prompts the bus control unit 14 to read the status information (step 206). Thus, the bus control unit 14 supplies the address information of the status port 33 to the slave processor 30 via the address bus 40 and reads out the status information from the status port 33 via the data bus 50, as shown in FIG. 3. The read-out status information is judged by the execution unit 12 (step 207). If the status information includes arithmetic exception data representative of overflow or zero-divisor, the execution unit 12 performs an error representation as a slave processor arithmetic exception operation 210. When the status information does not include the abnormal value and the arithmetic exception, the execution unit 12 prompts the bus control unit 14 to read out the arithmetic result (step 209). As a result, the bus control unit 14 supplies the address information of the operand port 34 to the slave processor 30 via the address bus 40 and the arithmetic result stored in the operand port 34 is read out and then transferred to the data bus 50.

Since the absence of the slave processor 30 is detected by reading and judging the content of the status information of the status port, the master processor 10 does not require a flag representative of presence or absence of the slave processor 30. Moreover, the reading of the status information is carried out only when the busy signal takes information representative of completion of an arithmetic operation of the unit 31, and therefore the buses 40 and 50 are not occupied with reading the status information.

Figure 4:
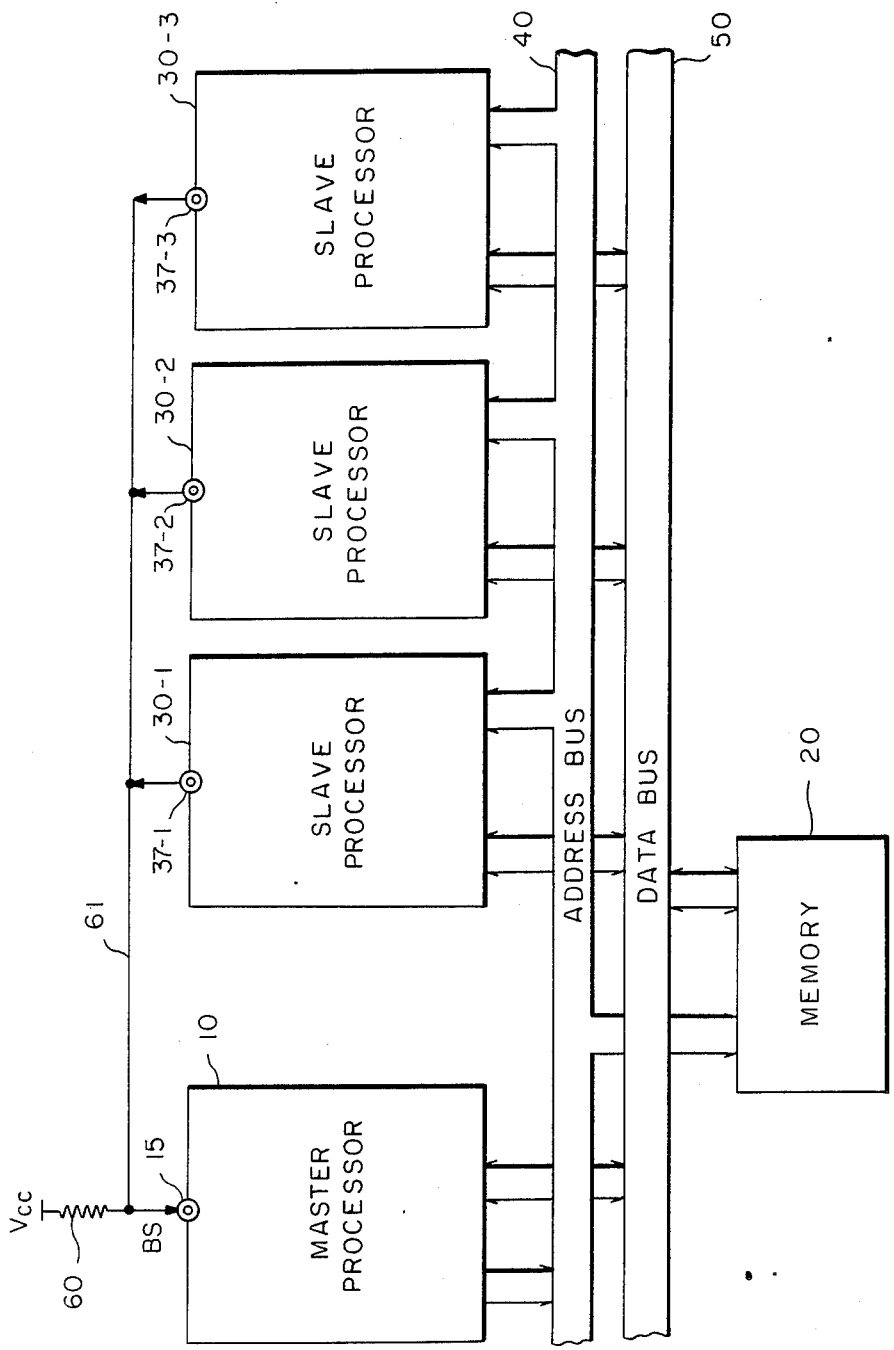
FIG. 4 is a block diagram representative of a modification of the embodiment shown in FIG. 1.

Referring to FIG. 4, a plurality of slave processors (three processors in the drawing) 30-1, 30-2 and 30-3 are coupled to the master processor 10 via the address and data buses 40 and 50. Each of the slave processors 30-1 to 30-3 has the same construction as that shown in FIG. 1, and busy signal output terminals 37-1 to 37-3 thereof are connected in common to the terminal 15 of the master processor 10 via the line 61. Since each port of the respective slave processors 30-1 to 30-3 is assigned to an individual address space, only one of the ports among the slave processors 30-1 to 30-3 is accessed by the address information produced by the master processor 10. Since each of the slave processors 30-1 to 30-3 includes a transistor of an open-drain type (transistor 36 in FIG. 1), the busy signal BS is controlled by one of the slave processors 30-1 to 30-3 which is in an arithmetic operating state. Thus, the master processor 10 can control a plurality of slave processors 30-1 to 30-3 in the same manner as described hereinbefore.

In the above-mentioned embodiment, the status information of the slave processor 30 is always read out. However, when the status information does not include the abnormal information or the arithmetic exception information, the reading of the status information is not necessary. That is, the arithmetic result can be read from the slave processor without reading the status information. The processing time of the high level instruction is thereby further shortened.

Figure 5:
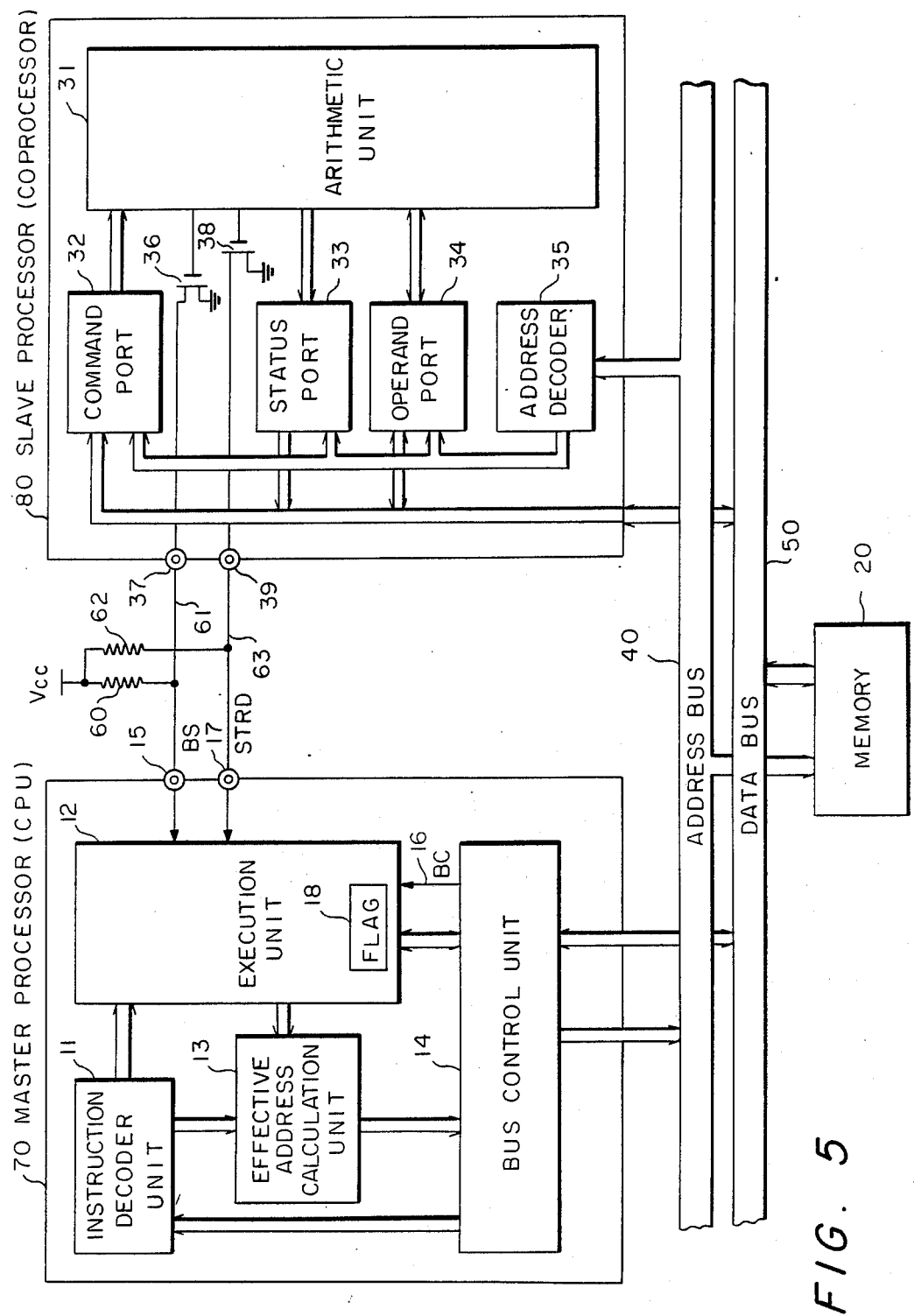
FIG. 5 is block diagram representative of another embodiment of the present invention.

For this purpose, as shown in FIG. 5 as another embodiment of the present invention, a master processor 70 is provided with a second input terminal 17 coupled to the execution unit 12 and a slave processor 80 is provided with a second N-channel MOS transistor 38 of an open-drain type and a second output terminal 39. The terminals 17 and 39 are connected to each other via a signal line 63 which is in turn pulled up to the power voltage Vcc via a resistor 62. The drain-source path of the transistor 38 is connected between the terminal 39 and the ground and the gate thereof is connected to the arithmetic unit 31. The unit 31 supplies the high level to the transistor 38 at the end of the arithmetic operation when the necessity of reading the status information does not occur, i.e. when the arithmetic exception and flag updating do not occur as a result of the arithmetic operation. The transistor 38 is thereby turned ON to change the line 63 to the low level. The level of the line 63 is supplied via the terminal 17 to the execution unit 12 as a status read request signal STRD.

A detailed description of a circuit operation will be made below with reference to the flow chart shown in FIG. 6 and timing charts shown in FIGS. 7A and 7B.

Figure 6:
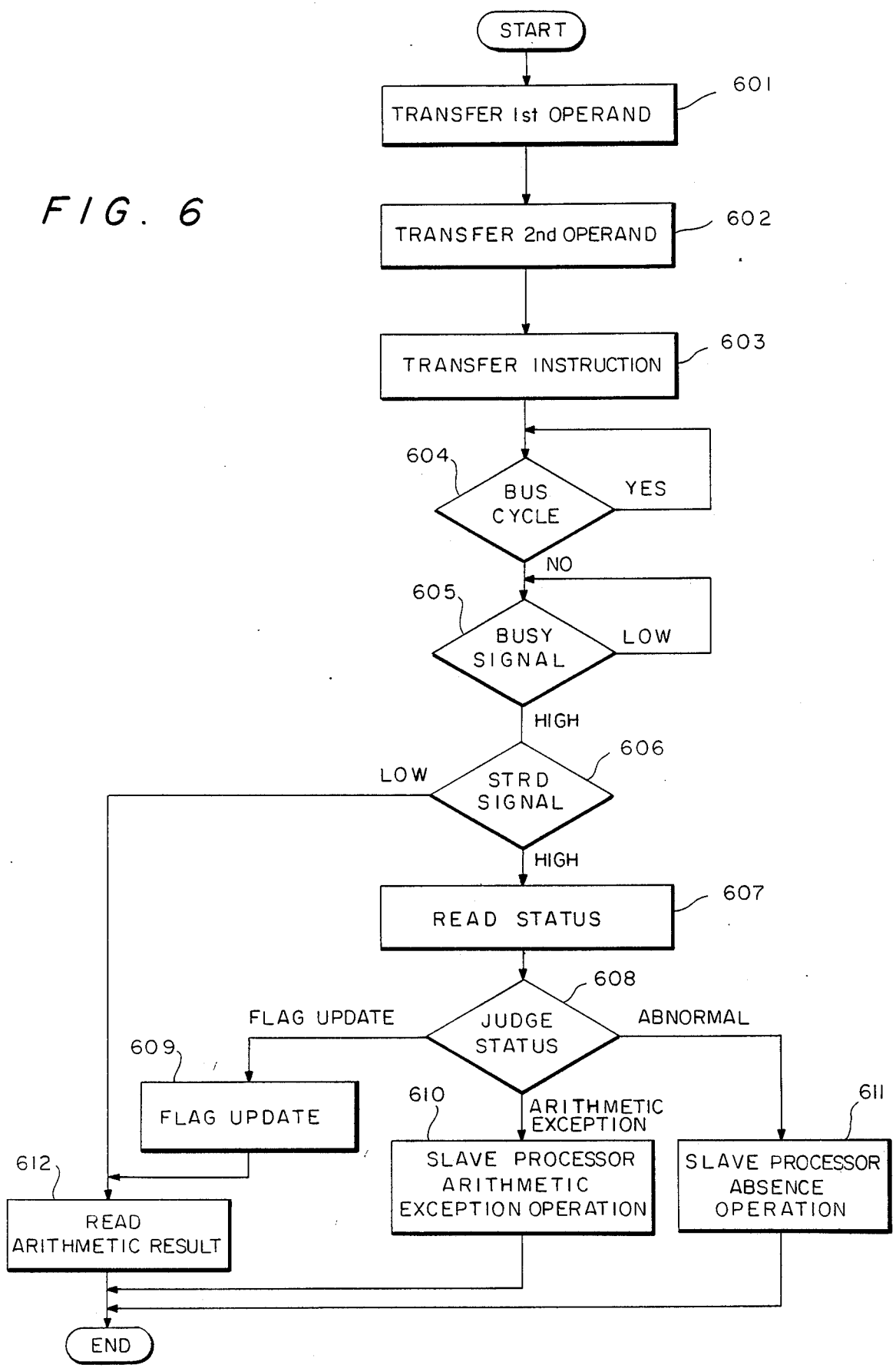
FIG. 6 is a flow chart representative of an operation of a master processor shown in FIG. 5.
Figure 7A:
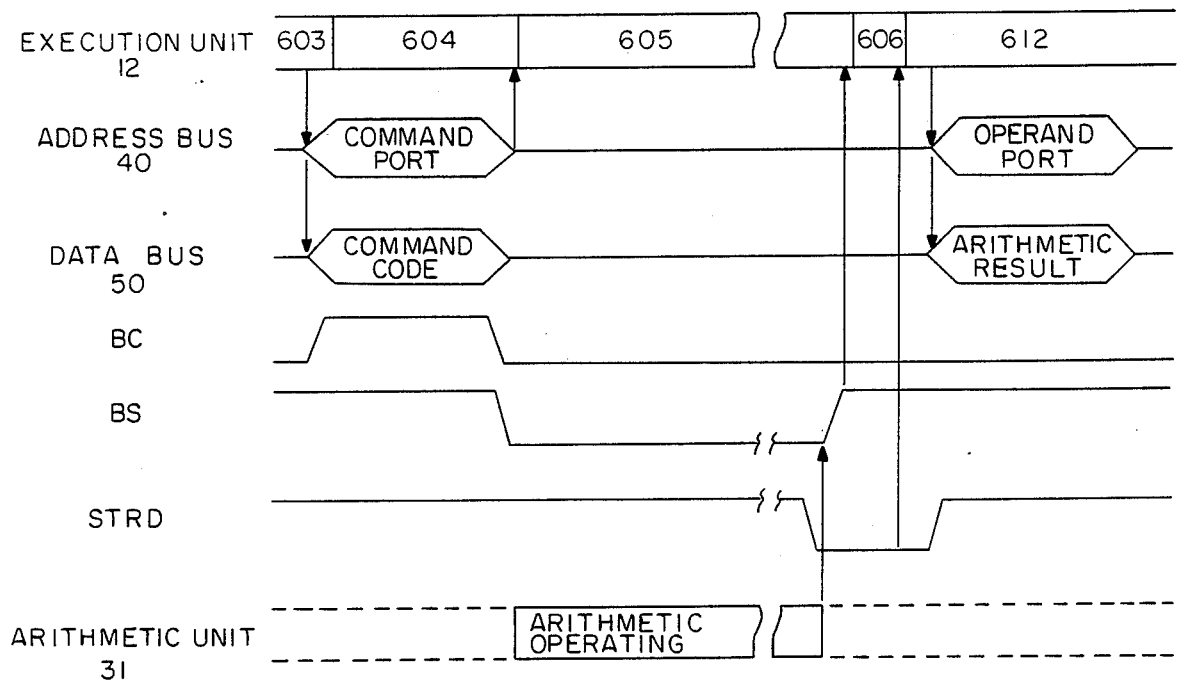
FIGS. 7A and 7B are timing charts representative of the operation shown in FIG. 6.
Figure 7B:
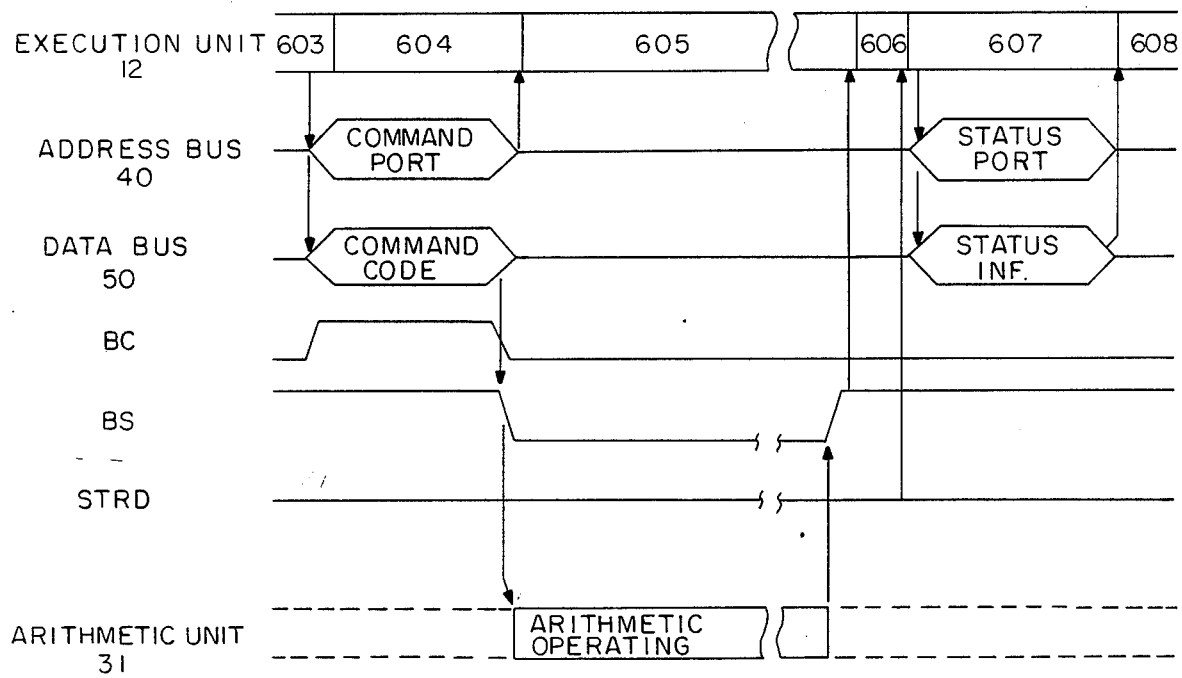

The flow chart of FIG. 6 indicates a dyadic operation of "A+B→B". Steps 601 to 605 correspond respectively to the steps 201 to 205 of FIG. 2, and therefore the description thereof is not repeated. When the execution unit 12 detects the high level of the busy signal BS, it catches the status read request signal STRD supplied from the terminal 17 to detect the level thereof. Assuming that both the arithmetic exception and flag updating do not occur, the arithmetic unit 31 supplies the high level to the transistor 38 at the end of the arithmetic operation. The transistor 38 is thereby turned ON to change the status read request signal STRD to the low level, as shown in FIG. 7A. Therefore, the execution unit 12 receives the low level signal STRD. As a result, the execution unit 12 prompts the bus control unit 14 to read the arithmetic result without reading the status information of the slave processor 80 (step 612). Thus, the bus control unit 14 supplies the address information of the operand port 34 to the slave processor 80 via the address bus 40 and reads out the arithmetic result stored in the port 34 via the data bus 50, as shown in FIG. 7A. The processing time of the high level instruction is thereby made short.

In contrast, when the arithmetic exception or flag updating occurs, the arithmetic unit 31 does not turn the transistor 38 ON. The status read request signal STRD is thereby maintained at the high level, as shown in FIG. 7B. Since the execution unit 12 receives the high level signal STRD, it prompts the bus control unit 14 to read the status information (step 607). Thus, the bus control unit 14 supplies the address information of the status port 33 to the slave processor 80 via the address bus 40 and reads out the status information stored therein via the data bus 50, as shown in FIG. 7B. The execution unit 12 judges the content of the read-out status information (step 608). When the status information contains the arithmetic exception data, the execution unit 12 carries out a slave processor arithmetic exception operation which has been described hereinbefore (step 610). In a case where the status information contains flag updating data, the execution unit 12 updates the content of one of the associated flags 18 (step 609). The updated flag is used for a branch operation or a subroutine procedure, for example. Thereafter, the execution unit 12 prompts the bus control unit 14 to read the arithmetic result (step 612).

If the slave processor 80 is absent, both the busy signal BS and the status read request signal STRD are maintained at the high level. All of the bits of the read-out status information take "1" or "0". As a result, the execution unit 12 executes a slave processor absence operation (step 611) which has been mentioned above.

Since the bus cycle for reading the content of the status port 33 can be omitted by use of the status read request signal STRD, the execution time of the high level instruction is further shortened.

Figure 8:
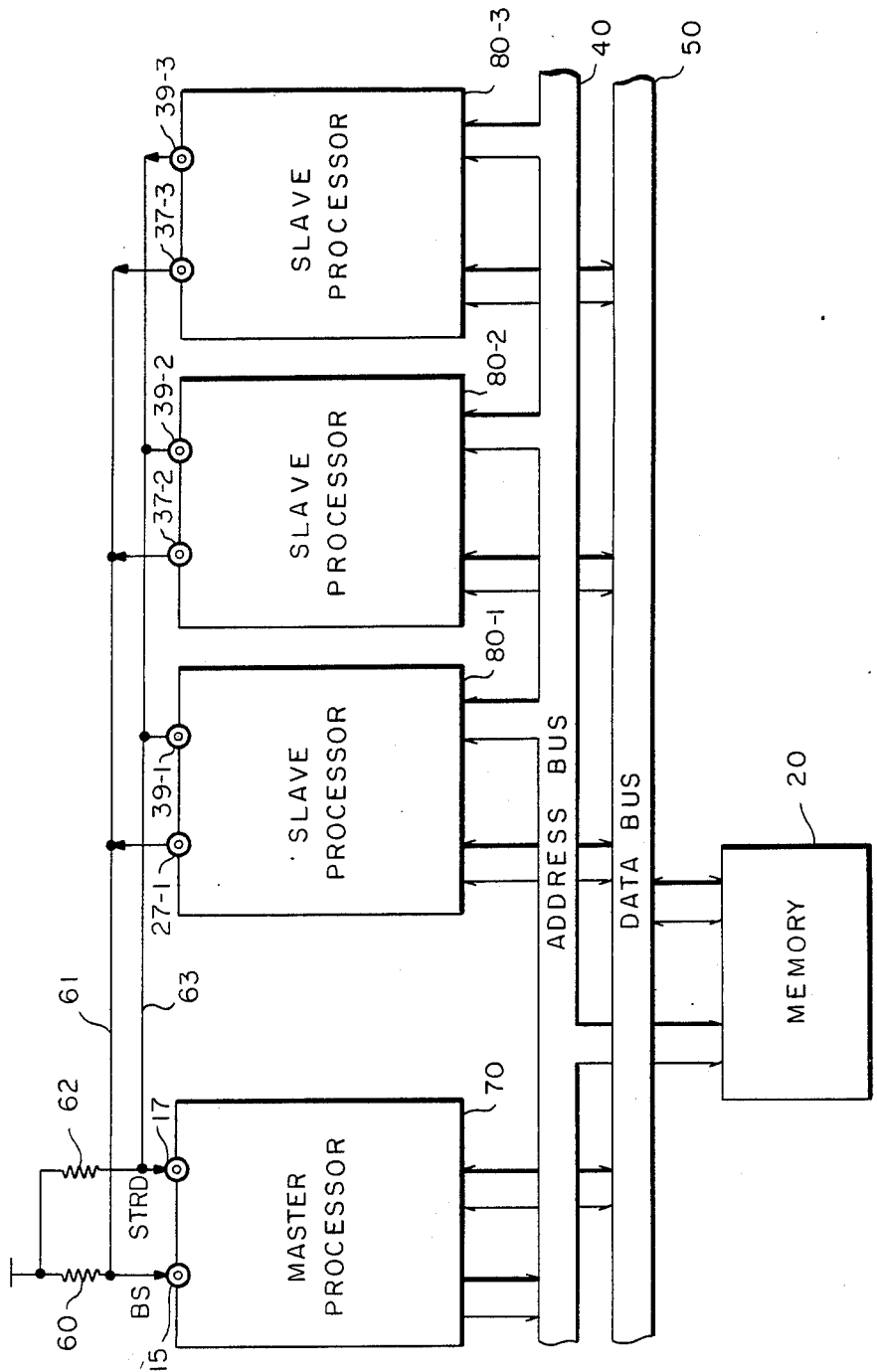
FIG. 8 is a block diagram representative of a modification of the embodiment shown in FIG. 5.

Referring to FIG. 8, the master processor 70 is connected with a plurality of slave processors (three processors in the drawing) 80-1, 80-2 and 80-3 each having the same construction as that shown in FIG. 5. The busy signal output terminals 37-1, 37-2 and 37-3 of the slave processors 80-1 to 80-3 are connected in common to the terminal 15 of the master processor 70 via the line 61, and the status read request signal output terminals 39-1 to 39-3 are connected in common to the terminal 17 via the line 63. Since the respective ports of the slave processors 80-1 to 80-3 are assigned to respective address spaces, the master processor 70 can individually control these slave processors 80-1 to 80-3.

The present invention is not limited to the above-mentioned embodiments, but may be changed and modified without departing from the scope and spirit of the invention.

What is claimed is:

1. A micro processor, comprising:
an execution unit executing a program;
a bus control unit coupled to said execution unit and performing a first bus cycle for supplying a command code to a coprocessor when said execution unit receives an instruction to be executed by said coprocessor;
a terminal connected to said execution unit;
said execution unit including detecting means for detecting a logic level of said terminal after said first bus cycle is performed, control means for controlling said bus control unit to perform a second bus cycle for reading status information of said coprocessor and to obtain status data relative to said status information of said coprocessor when the logic level of said terminal is detected to be a first logic level;
judging means, responsive to a content of said status data, for judging whether or not said coprocessor is connected to said micro processor; and
execution means for executing said instruction when said status data indicates that said coprocessor is not connected to said micro processor and for reading an executing result of said instruction from said coprocessor when said status data indicates that said coprocessor is connected to said micro processor.

2. A micro processor as claimed in claim 1, wherein said bus control unit supplies to said execution unit a bus cycle signal representing that said bus control unit is performing said first bus cycle, and wherein said detecting means detects the level of said terminal when said bus cycle signal disappears.

3. A micro processor, comprising:
an execution unit executing a program;
a bus control unit coupled to said execution unit and supplying a command signal to a coprocessor via a data bus when said execution unit receives an instruction to be executed by said coprocessor;
a first terminal connected to said execution unit and supplied from said coprocessor with a busy signal representing that said coprocessor is in an arithmetic operating state; and
a second terminal connected to said execution unit and supplied from said coprocessor with a status read request signal representing that said coprocessor requests said execution unit to read status information of said coprocessor, said execution unit controlling said bus control unit to read output data of said coprocessor without reading said status information of said coprocessor when both of said busy signal and said status read request signal are absent and controlling said bus control unit to read said status information of said coprocessor when said busy signal is absent and said status read request signal is present.

4. A micro processor as claimed in claim 1, wherein said coprocessor, when connected to said micro processor, holds said terminal at a second logic level until said coprocessor completes execution of said instruction and thereafter changes said terminal to said first logic level from said second logic level, so that said judging means judges that said coprocessor is connected to said micro processor and so that said execution unit controls said bus control unit to perform a third bus cycle for reading result data from said coprocessor.

5. A micro processor which executes a program in cooperation with a coprocessor when said coprocessor is connected to said micro processor and which executes said program by itself when said coprocessor is not connected to said micro processor, said program including a first type instruction to be executed by said micro processor and a second type instruction to be executed by said coprocessor, said micro processor comprising:
execution means for executing said first type instruction;
a bus control unit coupled to an address bus and a data bus to which said coprocessor is also to be connected;
first control means, responsive to said second type instruction, for controlling said bus control unit to transfer onto said address bus first address information for accessing said coprocessor and to transfer onto said data bus command information corresponding to said second type instruction irrespective of whether said coprocessor is connected to said micro processor;
a terminal, to which said coprocessor is to be connected, said terminal being held at a first logic level when said coprocessor is not connected thereto and said terminal being held at a second logic level until said coprocessor completes execution of said second type instruction and thereafter being changed to said first logic level when said coprocessor is connected to said terminal;

detection, means coupled to said terminal, for detecting the logic level at said terminal after said command information is transferred onto said data bus and for producing a detection output when said terminal is at said first logic level;

second control means, responsive to said detection output, for controlling said bus control unit to transfer onto said address bus second address information for accessing said coprocessor and to store stored data on said data bus irrespective of whether said coprocessor is connected to said micro processor;

judging means, responsive to a content of said stored data, for judging whether or not said coprocessor is connected to said micro processor via said address bus and said data bus and said terminal; and performance means for performing an operation required by said second type instruction when said coprocessor is judged to be not connected to said micro processor.

6. A micro processor as claimed in claim 5, further comprising:

third control means for controlling said bus control unit to transfer onto said address bus third address information for accessing said coprocessor and to read result data from said coprocessor via said data bus when said coprocessor is judged to be connected to said micro processor.

7. A micro processor as claimed in claim 6, wherein said coprocessor includes a command port, a status port and an operand port, said first address information accessing said command port, said second address information accessing said status port, and said third address information accessing said operand port.

8. A micro processor which executes a program in cooperation with a coprocessor when said coprocessor is connected to said micro processor and which executes said program by itself when said coprocessor is not connected to said micro processor, said program including a first type instruction to be executed by said micro processor and a second type instruction to be executed by said coprocessor, said micro processor comprising:

execution means for executing said first type instruction;

a bus control unit coupled to an address bus and a data bus to which said coprocessor is also to be connected;

first and second terminals to which said coprocessor is to be connected;

first control means, responsive to said second type instruction, for controlling said bus control unit to transfer onto said address bus address information for accessing said coprocessor and to transfer onto said data bus command information corresponding to said second type instruction;

said first terminal being at a first logic level when said coprocessor is not connected to said first terminal and said first terminal being at a second logic level until said coprocessor completes execution of said second type instruction when said coprocessor is connected to said first terminal, said second terminal being at said first logic level when said coprocessor is not connected to said second terminal and said second terminal being applied with said first logic level when said coprocessor requests said micro processor to read status information of said coprocessor and with said second logic level when said coprocessor does not request said micro processor to read said status information when said coprocessor is connected to said second terminal;

first detection means, coupled to said first terminal, for detecting the logic level of said first terminal after said command information is transferred onto said data bus;

second detection means, coupled to said second terminal, for detecting the logic level of said second terminal after said first terminal is detected to be at said first logic level;

second control means for controlling said bus control unit to transfer onto said address bus address information for accessing said coprocessor and to read result data from said coprocessor via said data bus when said second terminal is detected to be at said second logic level; and third control means for controlling said bus control unit to transfer onto said address bus address information for accessing said coprocessor and to fetched data on said data bus when said second terminal is detected to be at said first logic level.

9. A micro processor as claimed in claim 8, further comprising:

judging means, responsive to a content of said fetched data, for judging whether or not said coprocessor is connected to said micro processor via said address and data buses and said first and second terminals; and performance means for performing an operation required by said second type instruction when said coprocessor is judged to be not connected to said micro processor.

10. A microcomputer system, comprising:

a memory storing a program;

a micro processor having first and second input terminals;

a coprocessor having first and second output terminals;

a system bus interconnecting said memory, said micro processor and said coprocessor;

a first line connecting said first input and output terminals to each other; and a second line connecting said second input and output terminals to each other;

said micro processor including first execution means for executing said program, and transfer means for transferring command information to said coprocessor via said system bus when said micro processor receives an instruction to be executed by said coprocessor;

said coprocessor including second execution means, responsive to said command information, for executing an arithmetic operation, busy signal supply means for supplying a busy signal from said first output terminal via said first line to said first input terminal during execution of said arithmetic operation, and status read request signal supply means for supplying a status read request signal from said second output terminal via said second line to said second input terminal when an arithmetic exception occurs;

said micro processor further including first detection means, coupled to said first input terminal, for detecting whether or not said first input terminal is supplied with said busy signal and for bringing said micro processor into a standby condition until said busy signal disappears, second detection means, coupled to said second input terminal, for detecting whether or not said second input terminal is supplied with said status read request signal after said busy signal is detected to have disappeared, first access means for accessing said coprocessor to read arithmetic result data from said coprocessor via said system bus when said second input terminal is detected to be not supplied with said status read request signal, and second access means for accessing said coprocessor to read status information from said coprocessor via said system bus when said second input terminal is detected to be supplied with said status read request signal.

11. A microcomputer system, comprising:
a master processor including a first terminal;
a slave processor including a second terminal;
a memory storing a program;
a bus interconnecting said master processor, said slave processor and said memory; and
a signal line connected between said first and second terminals;
said master processor including execution means for executing said program, and transfer means for transferring command information via said bus to said slave processor when said master processor receives an instruction to be executed by said slave processor;
said slave processor including performance means, responsive to said command information, for performing an arithmetic operation, and busy signal supply means for supplying a busy signal from said second terminal to said first terminal via said signal line to inform said master processor that said slave processor is in an arithmetic operating state;
said master processor further including first detection means, coupled to said first terminal, for detecting whether or not said first terminal is supplied with said busy signal after said command information is transferred to said slave processor, reading means for reading status information from said slave processor through said bus in response to an output from said first detection means representing that said first terminal is not supplied with said busy signal, judging means, responsive to a content of said status information, for judging whether or not said slave processor is present, and performance means for performing said arithmetic operation when said status information indicates that said slave processor is absent and for reading an arithmetic result of said slave processor through said bus when said status information indicates that said slave processor is present.

* * * * *